United States Patent [19]

Ogasawara et al.

[11] Patent Number: 4,787,494
[45] Date of Patent: Nov. 29, 1988

[54] HYDRAULIC OPERATING UNIT OF FRICTION ENGAGING APPARATUS FOR TRANSMISSIONS

[75] Inventors: Tsunehiko Ogasawara; Koji Sumiya, both of Aichi, Japan

[73] Assignees: Aisin Seiki Kabushiki Kaisha, Kariya; Aisin Warner Kabushiki Kaisha, Aichi, both of Japan

[21] Appl. No.: 45,425

[22] Filed: May 4, 1987

Related U.S. Application Data

[63] Continuation of Ser. No. 585,128, Mar. 1, 1984, abandoned.

[30] Foreign Application Priority Data

Mar. 31, 1983 [JP] Japan .................................. 58-57496

[51] Int. Cl.⁴ ...................... F16D 65/32; F16D 25/06
[52] U.S. Cl. .................................. 192/86; 188/151 R; 92/65
[58] Field of Search .............. 192/80, 85 AA, 85 AT, 192/86, 91 R, 91 A; 92/62, 63, 65; 188/72.4, 151 R

[56] References Cited

U.S. PATENT DOCUMENTS

| | | | |
|---|---|---|---|
| 3,007,562 | 11/1961 | Aschauer | 192/86 X |
| 3,171,526 | 3/1965 | Waclawek | 192/85 C X |
| 3,324,771 | 6/1967 | Cruse | 92/63 X |
| 3,974,896 | 8/1976 | Rach | 192/91 A X |
| 4,388,986 | 6/1983 | Umezawa | 92/65 X |

FOREIGN PATENT DOCUMENTS 1155231 4/1958 France .................................. 92/62

Primary Examiner—Rodney H. Bonck
Assistant Examiner—Richard M. Lorence
Attorney, Agent, or Firm—Burns, Doane, Swecker & Mathis

[57] ABSTRACT

A hydraulic operating unit for the friction engaging apparatus of a transmission provides a hydraulic operating unit which permits the introduction of a low-pressure working fluid to permit the forceable disengagement of the hydraulic operation unit to work against the fluid which would normally urge the unit into engagement. The effective pressure-receiving area on the releasing side of a hydraulic power servo mechanism is made sufficiently large with respect to the effective pressure-receiving area on the engaging side of the servo mechanism while the piston diameter is kept small in order to save space in the construction of the servo mechanism while at the same time permitting the device to effectively disengage the friction mechanism.

13 Claims, 3 Drawing Sheets

HYDRAULIC OPERATING UNIT OF FRICTION ENGAGING APPARATUS FOR TRANSMISSIONS

This application is a continuation, of application Ser. No. 585,128, filed Mar. 1, 1984 now abandoned.

FIELD OF THE INVENTION

This invention relates to a hydraulic operating unit of a friction engaging apparatus for a vehicle transmission.

BACKGROUND

In the prior art, a hydraulic operating unit (hydraulic power servo mechanism) of a friction engaging apparatus (such as a multi-plate clutch, multi-plate brake and pedal brake) used in a transmission for an automobile or the like is composed of a cylinder, a single piston and a return spring, etc. There has been much to be desired in the art for making the hydraulic operating unit hereinabove mentioned as compact as possible subject to maintaining requisite quick and stable actuation and release. Particularly, a larger diameter of the piston has been required for the single piston corresponding to a low hydraulic pressure in the case where different hydraulic pressures are applied to actuation and release.

SUMMARY OF THE DISCLOSURE

Accordingly it is an object of the present invention to provide a novel hydraulic operating unit of the friction engaging apparatus for transmissions to satisfy the desire in the art.

It is a further object of the present invention to provide a hydraulic operating unit of a friction engaging apparatus for a transmission wherein the unit is well-suited for use in cases where it is necessary to introduce a low-pressure working fluid to the releasing side to forcibly effect disengagement in a state where an engaging hydraulic pressure is applied to the engaging side.

It is a further object of the present invention to provide a hydraulic operating unit of a friction engaging apparatus for a transmission wherein the effective pressure-receiving area on the releasing side of a hydraulic power servo mechanism can be made sufficiently large with respect to the effective pressure-receiving area on the engaging side of the servo mechanism while piston diameter is kept small for the sake of the construction and loading property of the transmission.

Other objects of the present invention will become apparent in the entire disclosure.

In a hydraulic operating unit of a friction engaging apparatus for engaging each of the elements of a gear mechanism or for locking some of the elements to a stationary member in order to achieve a prescribed driving ratio between an input shaft and output shaft of a transmission, a hydraulic operating unit of a friction engaging apparatus in a transmission in accordance with the present invention, the hydraulic operating unit comprises a piston unit having a plurality of piston members, e.g., coaxially aligned (or pressure receiving areas) arranged within different cylinder chambers for one action (e.g., release). This feature enables a least piston diameter with the requisite functions.

Namely, according to the present invention there is provided a hydraulic operating unit comprising:
a pressing member for governing operation of the friction engaging apparatus,
a first piston coupled to the pressing member and slidably disposed in a first cylinder,
a second oil chamber for causing a pressure oil to act upon the first piston in a direction which causes the pressing member to engage the friction engaging apparatus,
a first oil chamber formed on a side of the first piston opposite the second oil chamber for causing a pressure oil to act upon the first piston in a direction which causes the pressing member to release the friction engaging apparatus,
a second piston coupled to the pressing member and slidably disposed in a second cylinder,
a third oil chamber so disposed as to cause a pressure oil to act upon the second piston in a direction which causes the pressing member to release the friction engaging apparatus, and
a flow passage communicating the third oil chamber and the first oil chamber.

The present inventin will now be described on the basis of an embodiment illustrated in the drawings, which, however, are being presented for illustrative purpose and not for limitative purpose. It should be understood that modifications apparent in the art may be made without departing from the concept and claimed scope of the present invention.

DETAILED DISCLOSURE OF THE PREFERRED EMBODIMENTS

Figure 1:
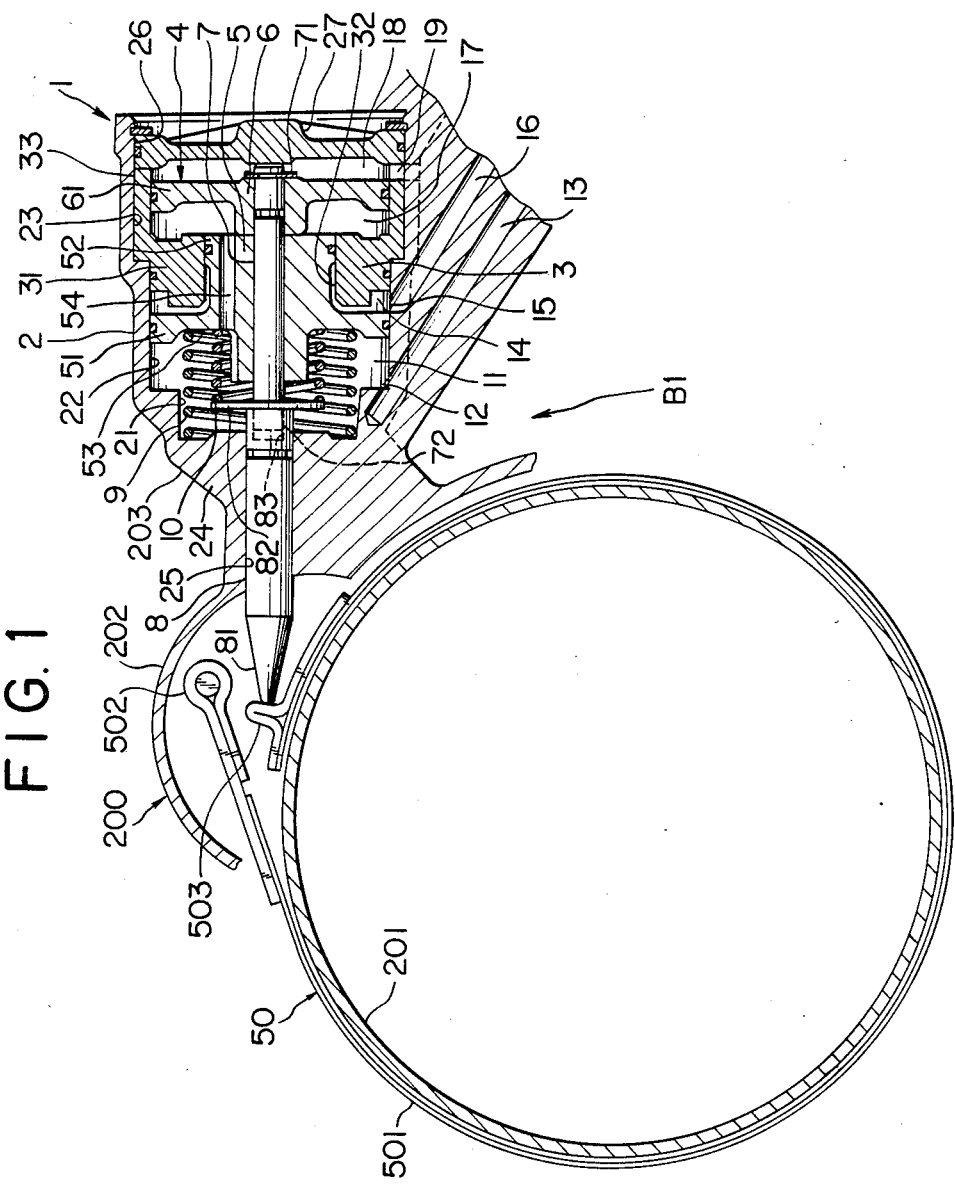
FIG. 1 is sectional view showing a first embodiment of a hydraulic operating unit used in a friction engaging apparatus for a transmission in accordance with the present invention.

FIG. 1 is a sectional view showing an embodiment of a hydraulic operating unit of a friction engaging apparatus for a vehicle in accordance with the present invention, as well as the friction engaging apparatus operated by the hydraulic operating unit.

In the illustrated embodiment, the friction engaging apparatus for the vehicle is a band brake 50, while the hydraulic operating unit is a hydraulic power servo mechanism 1.

The band brake 50 includes a strap-like friction band 501 wound once around the outer circumference of a prescribed rotation transmission drum 201 within a transmission 200, a fitting 502 affixed to one end of the friction band 501 and secured to a transmission case 202, and a pressure receiving fitting 503 affixed to the other end of the friction band 501.

The hydraulic power servo mechanism 1 comprises a cylinder body 2, a piston guide (a sleeve in the illustrated embodiment) 3 fitted into the cylinder body 2, a piston 4 constituted by a first piston 5, a second piston 6 and a piston rod 7, a push rod 8, a return spring 9, and a locking spring 10.

The cylinder body 2 is formed integral with the outer wall of the transmission case 202 and has a three-stage construction the inner diameter thereof comprises a small diameter portion 21, intermediate diameter portion 22 and large diameter portion 23, the diameters growing successively in 3 stages larger from the left-hand side of the cylinder body. Formed in the left-hand or leading end wall 24 of the cylinder body is an axially extending bore 25 through which the push rod 8 slides.

The aft end of the cylinder body 2 has an opening 26 capped by a flange plate 27. The sleeve 3 is cylindrical in shape and has a diameter which increases step-wise from the left-hand or leading end side thereof, the outer side of the sleeve having a three-stage configuration, the inner side thereof having a two-stage configuration. The sleeve 3 is fitted into the cylinder body 2 and extends from the large diameter portion 23 thereof to a point approximately midway along the intermediate diameter portion 22. The sleeve further includes an inwardly projecting annular wall or leading end area 31 which defines an inner diameter portion 32 within the cylinder body 2 approximately midway along the axial length thereof. The aft end area 33 of the sleeve 3 defines a cylinder along which the second piston 6 slides.

The first piston 5 is a tubular body having a flange plate 51 provided approximately midway along its length, the flange plate being fitted slidably into the intermediate diameter portion 22 of the cylinder body, as well as a small annular projection 52 provided at the aft end thereof, the annular projection being fitted slidably into the small diameter portion 32 of the sleeve. The first piston 5 is also provided with a communicating passage 54 penetrating the piston from the aft end face thereof to the front face 53 of the flange plate 51, and is fitted on the piston rod 7, which is disposed at the center of the cylinder body 2. The second piston 6 is a tubular body having a flange plate 61 provided on the aft end thereof, the flange plate 61 being fitted slidably into the aft end area 33 of the sleeve. The second piston 6 is fitted on the piston rod 7 next to the first piston 5 and is locked in place axially by a snap spring 71 fitted on the aft end of the piston rod 7. Disposed in series with the front end portion of the piston rod 7 is the push rod 8, which is fitted slidably within the bore 25 of the cylinder body 2. The push rod 8 has a tapered leading end 81 in contact with the locking fitting 503 of the band brake 50, and has a small diameter flange plate 82 provided at the aft end thereof. Formed within the push rod 8 is an axially extending hole 83 in which the leading end 72 of the piston rod 7 is slidably fitted. Installed between the small diameter flange plate 82 and the flange plate 51 of the first piston 5 is the locking spring 10 for pressing the push rod 8 forwardly with respect to the piston 4. The return spring 9 is installed between the lead end wall 24 of the cylinder body 2 and the flange plate 51.

An oil chamber 11 defined between the leading end wall 24 and the first piston 5 constitutes a first oil chamber which communicates with an oil passage 13 via an oil port 12. An oil chamber 14 defined between the first piston 5 and the annular wall 31 constitutes a second oil chamber which communicates with an oil passage 16 via an oil port 15. An oil chamber 17 defined between the second piston 6 and the annular wall 31 constitutes a third oil chamber which communicates with the first oil chamber through the communicating passage 54. A chamber 18 defined between the second piston 6 and the flange plate 27 has an opening defining a port 19.

The effective pressure-receiving area of the first oil chamber 11 and third oil chamber 17, which are the oil chambers on the releasing side, is larger, (e.g., approximately, 1.5-3 times) than the effective pressure-receiving area of the second oil chamber 14, which is the oil chamber on the engaging side.

The apparatus of the first embodiment operates in the following manner.

A hydraulic control device (not shown) for an automatic transmission is operated to selectively supply and discharge the working hydraulic pressure, whereby a shifting operation is accomplished by releasing a brake mechanism B1, which comprises the band brake 50 and the hydraulic servo 1, and engaging other friction engaging elements of the automatic transmission. When making such a shifting operation in accordance with the illustrated embodiment, the effective pressure-receiving area of the first oil chamber 11 and third oil chamber 17, which are the oil chambers on the releasing side, is set to about 1.5-3 times the effective pressure-receiving area of the second oil chamber 14, which is the oil chamber on the engaging side. Therefore, the brake mechanism B1 is released smoothly even under a condition where, with an engaging pressure P1 of the brake mechanism B1 supplied from the oil passage 16 to the second oil chamber 14, an engaging pressure P2 of the other friction engaging elements, which pressure P2 is lower than P1, is supplied from the oil passage 13 to the first oil chamber 11 and third oil chamber 17. Thus this embodiment enables a simplification of the oil passage system of the hydraulic control device.

The first embodiment described above, in which the small diameter portion 32 is formed by the annular wall 31, has the sleeve 3 fitted within the aft end of the cylinder, with the second piston 6 being fitted slidably within the inner diameter of the sleeve. Owing to such a construction, an important advantage is provided wherein the area difference between the releasing and engaging sides can be adjusted freely and over a wide range merely by changing the inner diameter of the sleeve 3 and the outer diameter of the second piston.

In the first embodiment, the oil port 15 is communicated with the oil passage 16, and the port 19 is communicated with an oil reservoir. However, it is permissible to communicate the oil port 15 with the oil reservoir, and to communicate the port 19 with the hydraulic control device, not shown through an oil passage (e.g., the oil passage 16). In such case, when the chamber 18 is supplied with the pressure oil, the second piston 4 is so urged as to cause the brake mechanism B1 to engage. Accordingly, the chamber 18 acts as the second oil chamber for engagement. The oil chambers 11 or 17 acting as the first or third oil chamber for release.

It should be noted that the oil passage 13 may be cut off from the oil port 12 and brought into communication with the oil chamber 17, or that the oil passage 13 may be brought into communication with the oil chamber 17 while communication with the oil port 12 is maintained. Further, though the communicating passage 54 serving as the passage for communicating the first and third oil chambers is formed in the first piston 5, this passage may be formed in a portion external to the cylinder.

Figure 2:
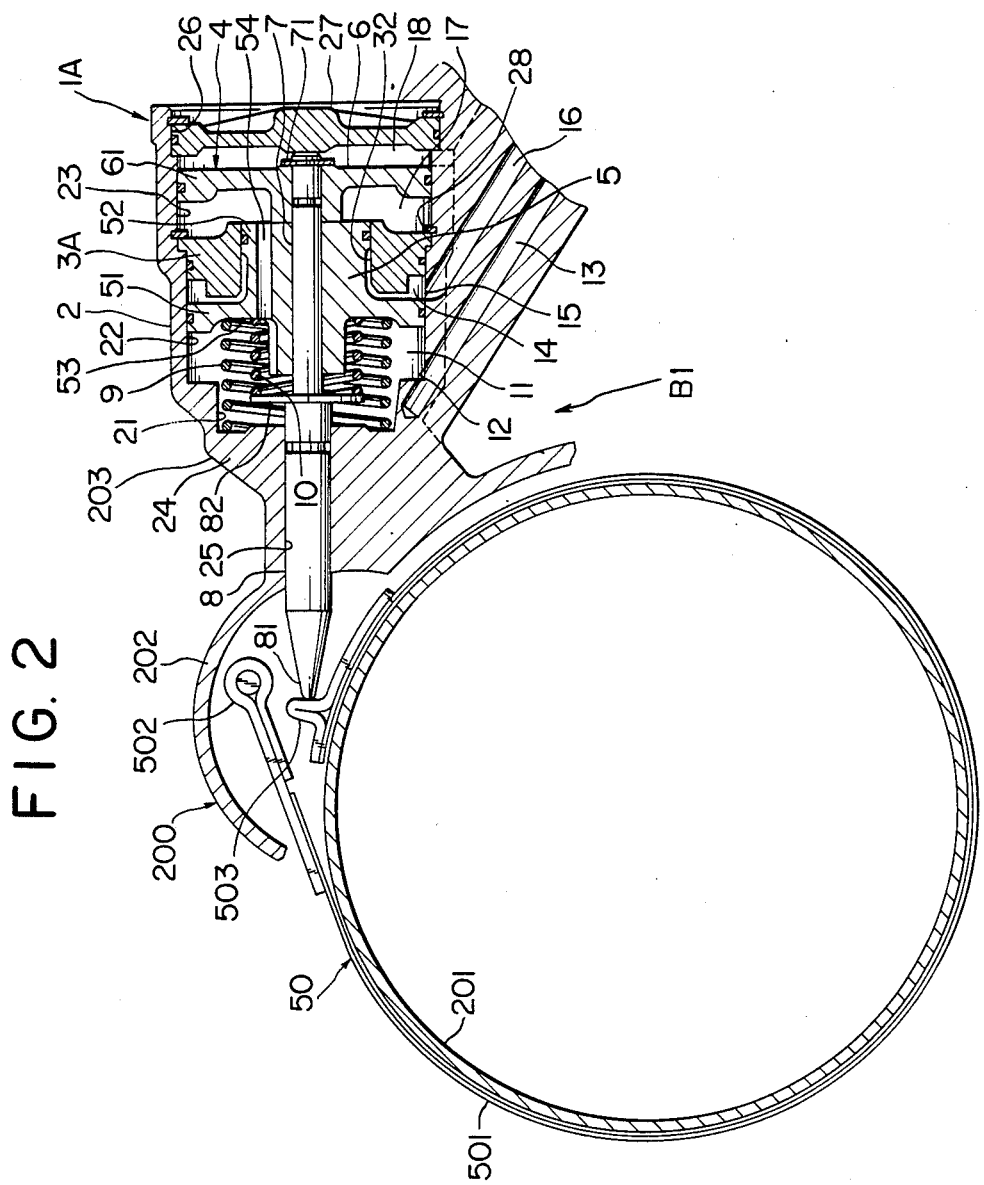
FIG. 2 is a sectional view showing a second embodiment of the present invention.

Next, a second embodiment illustrated in FIG. 2 will be described.

The hydraulic operating unit (a hydraulic power servo mechanism 1A of a band brake 50 in the illustrated embodiment) of a friction engaging apparatus for a transmission according to the second embodiment has a main structural element which is equivalent to the hydraulic power servo mechanism 1 of the first embodiment. Portions identical with those of the first embodiment are designated by like reference characters.

In the illustrated embodiment, a piston guide or sleeve 3A, having a shape obtained by cutting away the projecting aft end of the piston guide or sleeve 3 of the first embodiment, is fitted within the cylinder body 2 and locked in place by a snap spring 28. The second piston 6 is slidably fitted directly within the large diameter portion 23 of the cylinder body 2.

The operation of the second embodiment is identical with that of the first embodiment.

Figure 3:
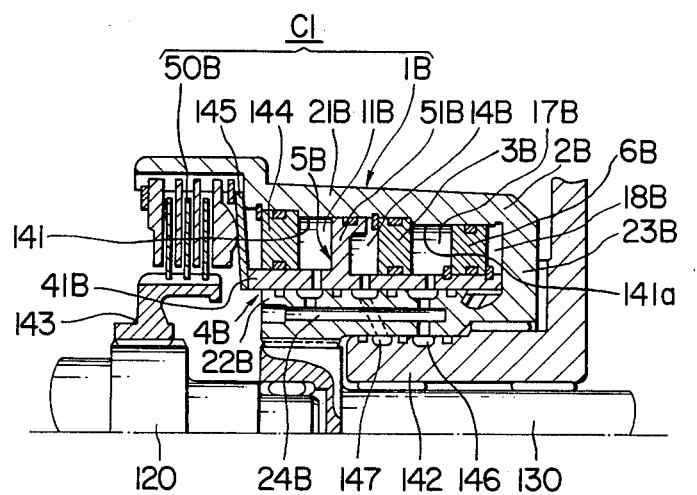
FIG. 3 is a sectional view showing a third embodiment of the present invention.

Described next will be a third embodiment illustrated in FIG. 3.

In this embodiment, the friction engaging apparatus for a transmission is a multi-disc clutch 50B, and the hydraulic operating unit is a hydraulic power servo mechanism 1B. The hydraulic power servo mechanism 1B is formed in an annular cylinder body 2B provided with an annular shaped cylinder hole 141, 141a which is open at the left-hand side of the drawing. The cylinder body 2B is rotatably supported on a cylindrical center suport 142 and is splined onto a transmission shaft 130, which is fitted rotatably within the center support 142. The multi-disc clutch 50B is installed within the aft end portion (the left-hand portion in the drawing) of the outer circumferential wall 21B of the cylinder body 2B. Thus the cylinder body 2B is connected to a transmission shaft 120 through the multi-disc clutch 50B and a connecting ring member 143.

An annular piston guide 3B is fitted within the cylinder hole 141 at a position approximately midway along the axial length of the outer circumferential side of the cylinder body. An annular plate 144 is fitted within the aft end portion of the cylinder hole 141. Both the piston guide 3B and annular plate 144 are locked in place by snap springs. This constructs a two-stage annular cylinder.

A first piston 5B, which is a cylindrical body provided at the intermediate portion thereof with a flange portion 51B that slides on an outer circumferential wall 21B between the piston guide 3B and the annular plate 144, is adapted to slide on the inner circumferential wall 22B of the cylinder body and the inner circumferential surfaces of the piston guide 3B and annular plate 144. Locked on the right-hand or leading end of the first piston 5B is a flange-shaped second piston 6B which slides on the outer circumferential wall 21B between the piston guide 3B and the leading end wall 23B of the cylinder body. This constructs a piston unit 4B with two-coupled pistons, the aft end 41B whereof is in abutting contact with an annular pressing plate 145 of the multi-disc clutch 50B.

An oil chamber 11B defined between the annular plate 144 and the flange portion 51B forms a first oil chamber, and an oil chamber 17B defined between the piston guide 3B and the second piston 6B forms a third chamber. The first and third oil chambers communicate with a flow passage 24B provided within the inner circumferential wall 22B of the cylinder body. The flow passage 24B communicates with an oil passage 146 which introduces pressure oil for effecting release. An oil chamber 14B defined between the flange portion 51B and the piston guide 3B forms a second oil chamber communicating with an oil passage 147 which introduces pressure oil for effecting engagement.

The third embodiment operates in the following manner.

A hydraulic control device (not shown) for an automatic transmission is operated to selectively supply and discharge the working hydraulic pressure, whereby a shifting operation is accomplished by releasing a clutch mechanism C1, which comprises the multi-disc clutch 50B and the hydraulic servo 1B, and engaging other friction engaging elements of the automatic transmission. When making such a shifting operation in accordance with the illustrated embodiment, the effective pressure-receiving area of the first oil chamber 11B and third oil chamber 17B, which are the oil chambers for release, is set to about 1.5–3 times the effective pressure-receiving area of the second oil chamber 14B, which is the oil chamber on the engaging side. Therefore, the clutch mechanism C1 is released smoothly even under a condition where, with an engaging pressure P3 of the clutch mechanism C1 supplied from the oil passage 147 to the second oil chamber 14B, an engaging pressure P4 of the other friction engaging elements, which pressure is lower than P3, is supplied from the oil passage 146 to the first oil chamber 11B and third oil chamber 17B. This embodiment also permits the simplification of the hydraulic passage and control system of the hydraulic control apparatus.

Though the third embodiment is an example in which the present invention is applied to the hydraulic servo of a multi-disc clutch, the invention may also be employed in the hydraulic servo of a multi-disc brake having such a similar construction. In such case, the cylinder body 2B will be a stationary member formed as a case or the like.

As in the first embodiment described hereinabove, the oil chamber 14B of the third embodiment may be communicated with an oil reservoir, and a chamber 18B may be communicated with a hydraulic control device (not shown) through an oil passage (e.g., the oil passage 147 for introducing the engaging pressure). In such case, when the chamber 18B is supplied with the pressure oil, the second piston 6B is so urged as to cause the clutch mechanism C1 to engage. Accordingly, the chamber 18B acts as the second oil chamber, the oil chamber 17B as the first oil chamber, and the oil chamber 11B as the third oil chamber.

It should be noted that though the flow passage 24B serving as the passage for communicating the first and third oil chambers is formed in the inner circumferential wall of the cylinder body, this passage may be formed in the outer circumferential wall of the cylinder body. It may also be formed in a portion of the center support 142.

Accordingly, in the hydraulic operating unit of a friction engaging apparatus for engaging each of the elements of a gear mechanism or for locking some of the elements to a stationary member in order to achieve a prescribed driving ration between an input shaft and output shaft of a transmission, the present invention exhibits particular effect and advantages due to the essential features as hereinabove disclosed and summarized on the SUMMARY as follows.

Namely, the present invention makes it possible to render the effective pressure-receiving area on the releasing side of a hydraulic power servo mechanism sufficiently large with respect to the effective pressure-receiving area on the engaging side of the servo mechanism while the piston diameter is kept as small as possible so as to benefit the construction and loading property of the transmission. Thus the invention is well-suited for use in causes where it is necessary to introduce a low-pressure working fluid to the releasing side to forcibly effect disengagement even in a state where an engaging hydraulic pressure is applied to the engaging side. The desired ratio of the total pressure-receiving areas between engaging and releasing sides of the respective pistons may be modified with great freedom over a wide range and without changing the cylinder diameter nor changing its outer configuration by merely replacing the annular wall member with a wall member having a different inner diameter or with another annular wall member in which the second piston is slidable fitted.

In the present invention the piston unit with coupled pistons may include additional pistons or oil chambers defined thereby, if necessary.

What is claimed is:

1. A hydraulic operating unit of a friction engaging apparatus for engaging some of the elements of a gear mechanism or for locking some of the elements to a stationary member in order to achieve a prescribed driving ratio between an input shaft and an output shaft of a transmission, comprising:
   a hollow cylinder body including an inner diameter surface;
   a piston guide positioned in said cylinder body, said piston guide including a first inner diameter portion and a second inner diameter portion larger than said first portion;
   a first piston having first slidable engagement means for engaging said inner diameter surface and second slidable engagement means for engaging said first inner diameter portion;
   means engageable with said first piston and slidable therewith for governing operation of the friction engaging apparatus;
   a second piston slidably and removably received in said second inner diameter portion;
   a first hydraulic chamber formed by said first slidable engagement means and a portion of said inner diameter surface adjacent said governing means and actable on said first piston in a direction causing said governing means to release said friction engaging apparatus, said first chamber having a first pressure acting area;
   a second hydraulic chamber formed between said first and second slidable engagement means and actable on said first piston in a direction causing said governing means to engage said friction engaging apparatus, said second chamber having a second pressure acting area;
   a third hydraulic chamber formed by said second inner diameter portion and said second piston and actable on said second piston in said direction causing said governing means to release said friction engaging apparatus, said third hydraulic chamber having a third pressure acting area;
   a flow passage communicating said first and third hydraulic chambers; and said piston guide being removably mounted in said cylinder body whereby the third pressure acting area may be adjusted by substitution of said piston guide and said second piston with a substitute piston guide and a substitute second piston, both said substitute piston guide and a substitute second piston, both said substitute guide and said substitute piston having dimensions different from said piston guide and said second piston.

2. A hydraulic operating unit as defined in claim 1, wherein the second piston is coaxially arranged with the first piston.

3. A hydraulic operating unit as defined by claim 1, wherein the first inner diameter portion of said piston guide has a smaller diameter than said inner diameter surface.

4. A hydraulic operating unit as defined by claim 1, wherein the sum of the first and third pressure acting areas is greater than said second pressure acting area.

5. A hydraulic operating unit as defined by claim 4, wherein the sum of said first and third pressure acting areas is 1.5 to 3.0 times the second pressure acting area.

6. A hydraulic operating unit as defined by claim 1, wherein said governing means includes a pressing member extending away from said first hydraulic chamber.

7. A hydraulic operating unit as defined by claim 6, wherein said pressing member selectively engages and disengages the friction engaging means.

8. A hydraulic operating unit as defined by claim 7, wherein said friction engaging means is a brake.

9. A hydraulic operating unit as defined by claim 6, including a piston rod axially disposed in said first piston, said piston rod extending through said first piston and into said first hydraulic chamber and engaging said pressing member.

10. A hydraulic operating unit as defined by claim 9, including a flange plate secured on said piston rod and positioned in said first hydraulic chamber, and a locking spring positioned in said first hydraulic chamber which biases said flange plate in a direction axial to said piston rod and away from said first piston.

11. A hydraulic operating unit as defined by claim 9, wherein said locking spring abuts said first piston.

12. A hydraulic operating unit as defined by claim 9 further including a return spring positioned in said first hydraulic chamber for biasing said first piston away from said friction engaging apparatus.

13. A hydraulic operating unit as defined by claim 12, wherein said return spring abuts said first piston.

* * * * *